June 13, 1933.  J. E. KEEFE  1,913,598
DENTAL INSTRUMENT
Filed Jan. 26, 1931

Inventor
James E. Keefe
By: Langdon Moore
Atty.

Patented June 13, 1933

1,913,598

UNITED STATES PATENT OFFICE

JAMES E. KEEFE, OF CHICAGO, ILLINOIS

DENTAL INSTRUMENT

Application filed January 26, 1931. Serial No. 511,319.

This invention relates to dental instruments more particularly for dealing with the contact points of teeth for purposes of determining the condition of such contacts and providing for the proper care of same.

Among other objects, my invention provides a simple and efficient contact cleaner which can safely be used by either the dentist or the individual.

The invention may be understood by reference to the illustrative embodiment thereof shown in the accompanying drawing, in which—

Figure 1:
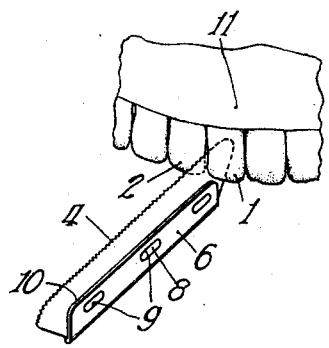
Figure 1 is a perspective view showing a number of teeth and an instrument embodying my invention applied thereto.
Figure 2:
Figure 2 is a plan view of the instrument illustrated in Figure 1.

Referring in detail to the figures of the drawing, I have shown a representation of two human teeth 1 and 2 which may normally contact at a point such as the point 3, for example. Teeth tend to decay at such contact points and the condition of such contact points should be frequently determined and cared for. One conventional method of determining the condition of said points and caring for same is by the use of dental floss, but dental floss is difficult to handle, breaks very quickly and has many other disadvantages and shortcomings. My invention removes the gluey film that adheres to the teeth and which floss cannot remove.

I have found that a pliant but resilient sheet of metal such as the thin sheet of German silver 4, shown for exemplification, may be advantageously used for the cleaning and inspection of said contact points and that when so used new and highly useful results are attained thereby. This sheet may be of gauge thickness ranging from .001 to .005.

The sheet 4 desirably has its edge 4a formed with slight irregularities and as here shown has the serrations or sinuosities 5 which are transverse to the plane of the sheet 4.

Figure 3:
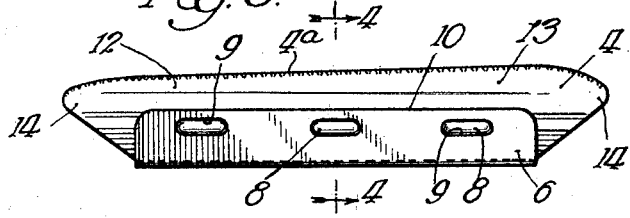
Figure 3 is a side elevation corresponding to Figure 2.
Figure 5:
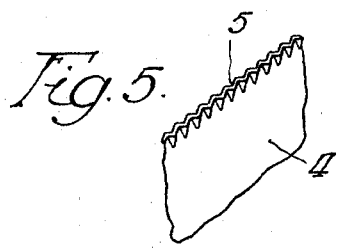
Figure 5 is an enlarged perspective view of the instrument shown in Figure 1 and showing a portion of the edge in detail.
Figure 4:
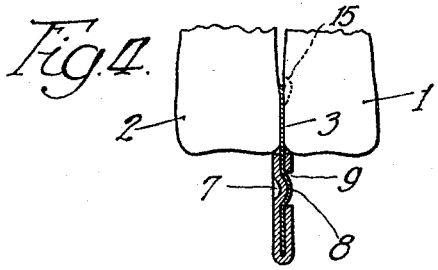
Figure 4 is a view showing a section taken on the line 4—4 of Figure 3 and showing two normally contiguous teeth.

The sheet 4 which is desirably very thin and pliable is provided with a backing which may be a piece of less pliable metal such as the piece 6 (Figure 3) here shown folded over an edge of the sheet 4 opposite the edge 4a. The backing 6 may be secured to the sheet 4 as by means of indentations 7 in one side of the backing 6 registering with the similar indentations 8 in the sheet 4 and both pressed by the bight of the backing 6, into apertures 9 upon the opposite side of the backing.

In the exemplification shown in Figures 1 to 4 inclusive, the backing 6 provides a shoulder 10 which desirably limits the extent to which the sheet 4 may be inserted between the teeth 1 and 2, thereby guarding against cutting or otherwise touching of the gums 11 by the edge 4a. The backing 6 also provides a reinforcement for the thin sheet 4, making it easier to handle and increasing its efficiency.

The shoulder 10 may conveniently be spaced from the edge 4a at varying distances such as at 12 and 13 to accommodate different sizes of teeth. One or more portions of the sheet 4 is desirably tapered as at 14 to facilitate insertion of the sheet between the teeth.

When the sheet 4 has been inserted between the contact points of the teeth 1 and 2, for example, as at the point 3, the teeth are readily forced apart slightly by the sheet 4 and the edge 4a, which may be caused to move back and forth therebetween, will quickly and effectively clean said contact point. The sheet 4 may also be inserted between the teeth to pass the contact point 3, but not far enough to touch the gums 11. If a cavity exists such as at 15, for instance, the edge 4a being sufficiently pliable to readily take a permanent set, will assume the contour of the cavity, which may thus be readily detected by one skilled in the art. The sheet 4 may of course be removed from between the teeth 1 and 2 without passing the portion of the edge 4a which has assumed the contour of the cavity 15, again through the contact points 3.

Figure 6:
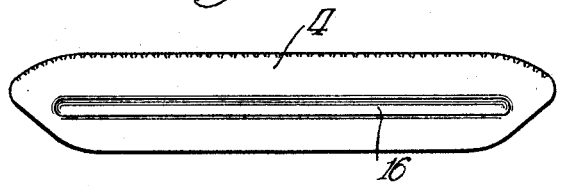
Figure 6 is a view corresponding to Figure 3 but of a modified form.

In Figure 6 I have shown a backing in the form of a portion of the sheet 4 itself which may have the longitudinal rib 16 pressed therein.

Figure 7:
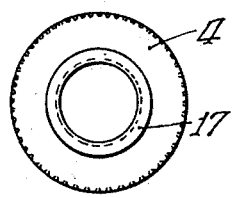
Figure 7 is a further modification.

Figure 7 shows a further modification in which the sheet 4 is made circular and has the circular rib 17 pressed therein.

Obviously, the invention is not limited to the precise details of construction shown above for illustration. Such changes may be made as fall within the scope of the following claims without departing from the invention.

I claim:

1. A device of the character described comprising in combination; a thin sheet of German silver, said sheet being pliable but resilient and having an edge embodying minute sinuosities transverse to the plane of said sheet; and a backing folded over said sheet upon an edge opposite said sinuous edge and spaced therefrom at varying distances, said backing having indentations therein engaging indentations in said sheet, whereby said backing is secured to said sheet.

2. The structure of claim 1 wherein the indentations in one side of the backing and the indentations in the sheet are in register with apertures upon the opposite side of the backing and are pressed into said apertures by the bight of said backing.

3. A device of the character described, comprising a thin sheet of German silver, said sheet being pliable but resilient and having an edge embodying minute sinuosities transverse to the plane of said sheet, said sheet having a rib pressed therein along its margin and spaced from said edge.

4. A device of the character described, comprising in combination; a thin sheet of German silver, said sheet being pliable but resilient and having an edge embodying minute sinuosities transverse to the plane of said sheet; and a backing for said edge, said backing including a portion of said sheet thickened along its margin and spaced from said edge.

5. A device of the character described comprising a thin sheet of slightly resilient pliable metal adapted to readily take a permanent set and having its edge distorted to produce a series of minute irregularities therein.

In witness whereof, I hereunto subscribe my name.

JAMES E. KEEFE.